Oct. 16, 1923.

M. H. GEARTTS 1,471,257

PERCOLATOR HANDLE PROTECTOR

Filed July 25, 1922

Inventor
M. H. Geartts,
By *[signature]*
Attorney

Patented Oct. 16, 1923.

1,471,257

UNITED STATES PATENT OFFICE.

MAE H. GEARTTS, OF MARINETTE, WISCONSIN.

PERCOLATOR-HANDLE PROTECTOR.

Application filed July 25, 1922. Serial No. 577,423.

*To all whom it may concern:*

Be it known that I, MAE H. GEARTTS, a citizen of the United States, residing at Marinette, in the county of Marinette and State of Wisconsin, have invented certain new and useful Improvements in Percolator-Handle Protectors; and I do hereby declare the following to be a full, clear, and exact description of the invention, such as will enable others skilled in the art to which it appertains to make and use the same.

Cooking utensils such as coffee and tea pots provided with handles of wood or like combustible material frequently suffer injury by the burning of the handle, particularly when the utensil is placed upon a gas stove. Besides the damage done to the utensil in the burning of the handle, casualties frequently occur such as scalding of the hand and the spilling of the contents of the utensil.

The present invention provides a protector which may be readily applied to the lower portion of the handle and which prevents the burning thereof and which is neat in appearance and capable of being readily detached and placed in position as required, said protector embodying a spring clip which engages about the handle and retains the protector in proper position thereon.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Figure 1:
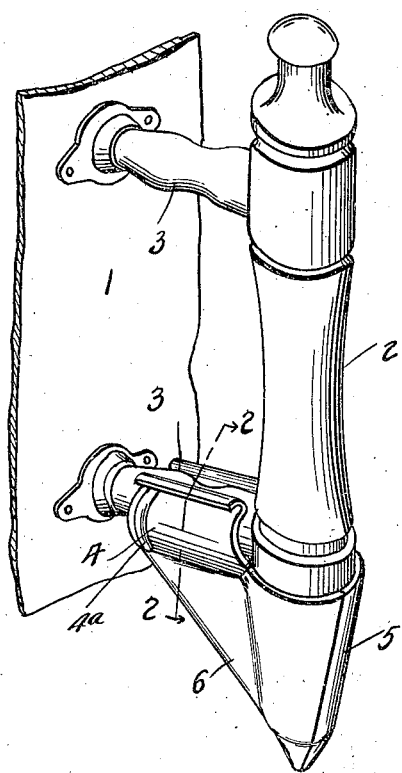
Figure 2:
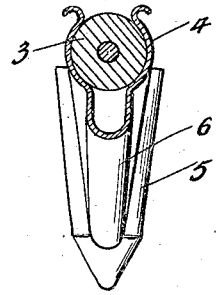
Figure 3:
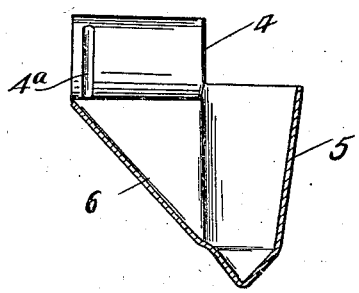
Figure 4:
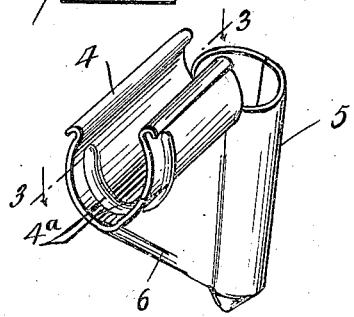

Referring to the accompanying drawings forming a part of the application,

Figure 1 is a perspective view of the handle of a percolator having a protector applied thereto embodying the invention, Figure 2 is a sectional detail on the line 2—2 of Figure 1, looking in the direction of the arrow, Figure 3 is a vertical central sectional view of the protector taken on line 3—3 of Fig. 4, and Figure 4 is a perspective view of the protector.

Corresponding and like parts are referred to in the following description and designated in the several views of the drawings by like reference characters.

The numeral 1 designates the body portion of a percolator or analogous utensil for preparing coffee or tea. The handle is of wood or other combustible material and comprises a vertically disposed grip 2 and lateral struts 3, the end portions of the grip projecting beyond the struts and finished in any manner to present a pleasing appearance. The lower portion of the handle, that is, the lower strut 3 and the lower end of the grip 2, is susceptible to the action of the heat, particularly when the utensil is placed upon a gas stove. To prevent the burning of the lower portion of the handle is the purpose of the present invention which provides a protector adapted to be detachably fitted thereto.

The protector is preferably constructed of sheet metal and comprises a clip 4, a socket 5, and a brace 6. The socket 5 receives the lower end of the grip 2 projecting below the lower strut 3. The clip 4 embraces the lower strut 3 and practically covers the bottom and sides thereof. Said clip 4 is preferably provided with outwardly struck beads 4$^a$. The brace 6 forms connecting means between the socket 5 and clip 4. The brace 6 is preferably though not necessarily hollow and also operates to dissipate the heat and prevent burning of the handle. It is observed that the clip 4 projects above the socket 5, thereby leaving a maximum amount of the part 2 exposed to be gripped without liability of the hand coming in contact with the protector and being burned thereby. The protector may be readily placed in position and easily removed, whereby provision is had for cleaning both the handle and the protector.

What is claimed is:

1. In a utensil embodying a handle of combustible material comprising a vertically disposed grip and lateral struts, the lower strut being disposed some distance above the lower end of the handle, a protector comprising a socket receiving the lower end of the handle, a clip engaging the lower strut and covering the bottom and sides thereof, and a brace between the clip and socket and connecting said parts.

2. In a utensil embodying a handle of combustible material comprising a vertically disposed grip and lateral struts, the lower strut being disposed some distance above the lower end of the handle, a sheet metal protector comprising a socket receiving the lower end of the handle, a clip engaging the lower strut and covering the bottom and sides thereof, and a hollow brace between the clip and socket and extending the full length of each.

3. Means for preventing the burning of the lower portion of the wooden handle of a percolator or like utensil, consisting of a socket, a clip and an intermediate brace, said parts being constructed of sheet metal and the socket being depressed below the clip whereby to expose a maximum amount of the handle to prevent contact of the hand with the protector.

In testimony whereof I affix my signature in presence of two witnesses.

MAE H. GEARTTS

Witnesses:
J. M. MANLEY,
R. H. KRAMER.